Dec. 1, 1953    J. ROTHSTEIN    2,660,805
LEVEL
Filed Sept. 19, 1950

INVENTOR
Jerome Rothstein

BY
W. J. Eccleston
ATTORNEY

Patented Dec. 1, 1953

2,660,805

UNITED STATES PATENT OFFICE 2,660,805

LEVEL

Jerome Rothstein, Belmar, N. J.

Application September 19, 1950, Serial No. 185,631

2 Claims. (Cl. 33—209)

(Granted under Title 35, U. S. Code (1952), sec. 266)

The invention described herein, if patented, may be manufactured and used by or for the Government for governmental purposes, without the payment to me of any royalty thereon.

This invention relates to an improvement in spirit levels. More particularly, the invention is concerned with bubble levels of the spirit level type for determining true horizontal.

Conventional spirit levels having an air bubble under which a liquid contained in a tube moves to show angular displacement are well known in the art. However, in the placement of precision instruments these levels do not satisfactorily determine extremely small tilts from the horizontal with any degree of fine sensitivity.

Accordingly, it is an object of this invention to provide an improved bubble type spirit level for determining true horizontal.

Another object of the invention is to provide a bubble spirit level of high precision for determining small angles of tilt with a high degree of sensitivity.

A further object of this invention is to provide a spirit level containing an indicator bubble pushed between balanced liquid bodies to measure true horizontal and slight deviations from true horizontal with mechanical precision.

Other objects and advantages will be apparent from the following description with reference to the accompanying drawings, wherein.

Figure 1:
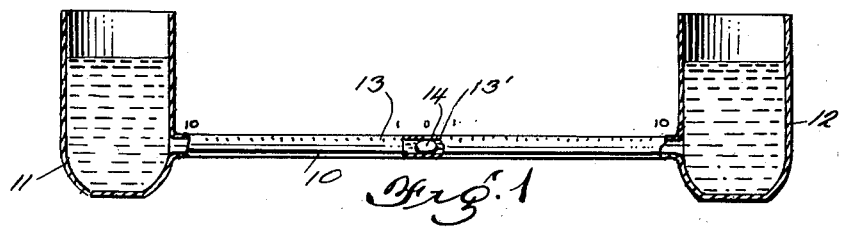
Figure 1 is a side view in partial cross-section of the spirit level embodying my invention.

Figure 1 illustrates the general structural plan and underlying principles of my improvement in spirit levels, a transparent capillary tube 10 of unit length L and having a cross-sectional bore area, for example, of 1 mm. is provided at its open ends with vertical tubes or containers 11 and 12 each having a cross-sectional bore area, for example, of 3.3 cm. hereinafter designated as area (a) and area (A) respectively. The capillary tube 10 is small enough so that the capillary effect produced thereby will cause the bubble to completely fill the cross sectional area of the tube, effectively separating the liquid in the tube, so that when the tube is tilted the liquid cannot flow around the bubble, but only push it along. Since the bore of the capillary tube 10 is much smaller than the bores of the containers 11 and 12, when the level is tilted from the horizontal, and the liquid in the containers 11 and 12 seeks a common level, the resulting movement of the indicating bubble in the capillary tube 10 will be greatly magnified, and the device will therefore accurately indicate very minute deviations from the horizontal. The tube 10 may, if desired, be provided with a set of scale markings 13 and 13' which may be calibrated on the basis of distance or angular displacement of an air bubble 14, or a similar other equivalent indicator. The bubble 14 is installed in the capillary tube 10 by being trapped therein by any conventional method, and shown as positioned between two equal volumes of water or other equivalent liquid contained in the capillary tube 10 and containers 11 and 12. As clearly shown in the drawings, the level of the liquid within the containers 11 and 12 is considerably above the points of connection of the capillary or indicating tube with the containers.

As illustrated, the air bubble 14 is positioned at the midpoint or zero marking of leveling capillary tube 10 when the two liquid volumes in the containers 11 and 12 are balanced on a horizontal level. Upon tilting of the tube 10 and its associated containers 11 and 12 the liquid volumes in each container are displaced and in seeking a new level, commensurate with the angle of displacement, push the air bubble to the right or left, dependent upon the angle of tilt.

Figure 4:
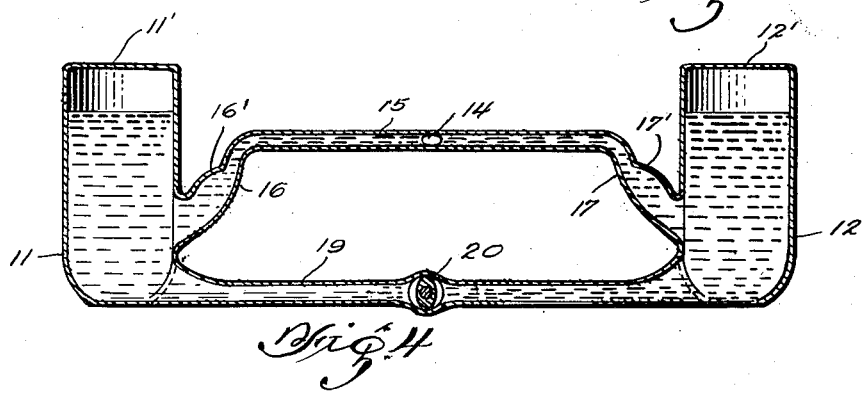
Figure 4 is a side view in partial cross-section illustrating a closed modification of Figure 3.

It will be apparent that an open-ended structure as shown by Figure 1 is subject to the loss of the bubble 14 when the tube 10 is tilted at a sufficient angle to permit the fluid from one end container to push the bubble into the other end container. Such bubble loss may be avoided in a permanent type level of the character herein described by providing, for example, closure members or sealed ends on containers 11 and 12, as illustrated in Figure 4. For example, with liquid volumes in each of the containers 11 and 12 which may be displaced or moved from container to container in an amount almost but not quite equal to the volume of liquid contained in the capillary 10, the bubble 14 cannot be forced all the way through the capillary level tube. Otherwise, for example, as shown by the balance of the figures the end containers 11 and 12 may be joined at their base portions by a capillary 15 of inverted U-shape having downturned vertical sections or legs 16 and 17 formed from a portion of the capillary tube 15 which are in effect extensions of the capillary bore in capillary tube 15, Figure 2. These downturned legs 16 and 17 are joined to the bases of containers 11 and 12 and form vertical capillary lifts or extended capillary passageways which prevent the loss of bubble 14 upon greater angular tilt than can be made by structure heretofore described. In this form the short length of the legs 16 and 17, with respect to sensitivity of measurement, is negligible and the length L is a measure of the distance indicated in the Figure 2.

Figures 2, 3:
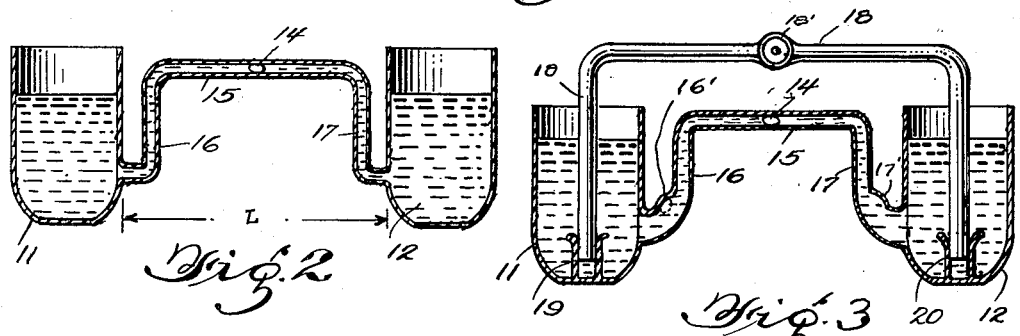
Figure 2 is a modification of Figure 1 showing the indicator level tube in a raised position to prevent bubble loss.
Figure 3 is a modification of Figure 2 and illustrates the application of a siphon to equalize liquid volumes in the spirit level.

With reference to Figure 3, the downturned capillary sections 16 and 17 are illustrated as being provided with enlargements or traps 16' and 17' in the capillary bore next to the junctures of tube 15 with the liquid containers 11 and 12. These enlarged bore portions 16' and 17' of capillary tube 15 provide a clearance space which prevents loss of the bubble 14 from the capillary by permitting passage or flow of liquid thereunder when the level is tilted excessively.

In order to provide for a setting of the bubble 14 and to equalize the amount of liquid on both sides of the bubble 14 a siphon tube 18, Figure 3, may be utilized. To illustrate, the siphon tube 18 is filled with water or other liquid contained in the level and dipped into the containers 11 and 12. To cut off the siphon flow, the downturned ends of the tube 18 may be removably mounted within receptacles or sleeves 19 and 20 in containers 11 and 12 respectively. These receptacles or sleeves 19 and 20 are ground to receive the tube ends making fluid-tight joints, and while the tube ends are inserted within the sleeves 19 and 20, the tube 18 is closed off from communication with the liquid in the containers 11 and 12. If desired, only one end may be fitted for closure. To reset the bubble the ends of tube 18 are withdrawn from the sleeves 19 and 20, and the bubble is set as if the device were a conventional spirit level. Further, the ground fittings 19 and/or 20 may be disposed of and the siphon flow controlled by the inclusion of a suitable valve and stopcock 18'. Because of the siphon action liquid levels in the wide bores in containers 11 and 12 will be equalized.

To illustrate a permanent type liquid leveling and bubble setting arrangement, there is shown in Figure 4 a secondary tube 19 connecting the bases of containers 11 and 12 through which fluid flow is controlled by suitable valve and stopcock 20. When the bubble 14 is set at zero or midpoint of the capillary tube 15 the stopcock 20 is closed and the indicating bubble becomes highly sensitive to any angular displacement of the level. The usual care should be observed relative to liquid contamination with respect to valve lubrication. As illustrated by Figure 4, the ends of the large bore of containers 11 and 12 are closed or sealed with covers 11' and 12' respectively and the level operates in the manner as described for the other figures which may likewise be covered, sealed or closed when the devices are utilized as permanent spirit levels. If desired, the siphon 18 of Figure 3 when utilized with a valve and stopcock 18' can be sealed through covers 11' and 12' as shown in Figure 4.

Figure 5:
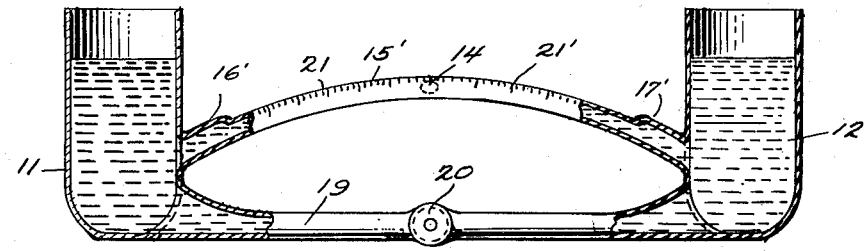
Figure 5 is a modification of Figure 4 illustrating a convexed capillary in the spirit level.

A further modification for preventing bubble loss is shown in Figure 5, wherein the capillary tube 15' is curved with the convexed side up, as illustrated, and in addition is provided with the auxiliary enlargements 16' and 17' in the lower ends of capillary tube 15' to function in the manner as described. In addition to providing a sensitive leveling structure the convex curvature of capillary tube 15' forms an arc which may carry a scale from which a tilt angle can be read. With the bubble set and valve and stopcock 20 open an angular position may be determined by the movement of bubble 14 under the scales 21 and 21'. Thereafter, with valve and stopcock 20 closed the level becomes extremely sensitive to slight and small changes in angles of tilt. This level and the other levels as described may be independently utilized or otherwise provided with precision mountings having vernier and micrometer scales or mirrors to get routine sensitive horizontal and angular measurements with an accuracy comparable to interferometric methods, and obtains such measurements in a much simpler manner.

In the structures as above described, any liquid of suitable viscosity and non-corrosive to the capillary may be used. Such liquids, for example, may be in the nature of mercury, alcohol, water and numerous oils. As described, the structures may be open or closed, and when open, liquids of high volatility would be of disadvantage from the standpoint of vaporization under conditions of use. In any event, with the liquids as described, an air bubble or other suitable indicator bubble does not stick or allow for passage of liquid thereunder in the narrow portion of the capillary tube. The bubble moves with the liquid a distance proportional to the ratio of the cross sectional area A of the vertical tube to the cross sectional area A of the capillary tube.

In place of an air bubble, any suitable indicating medium may be employed. For example, the bubble which is merely an indicator may be replaced by the boundary between two immiscible liquids such as oil and water, kerosene and alcohol, mercury and alcohol, or any other combination of such liquids. One or both of the liquids would be colored to present a clear line of demarcation between the liquids. Alternatively, a droplet of mercury or a metal ball could replace the bubble. Where a heavy indicator such as mercury droplet or metal ball is used, the U-structure of Figures 2, 3, 4, and 5 would be inverted, as the heavier indicator would seek the lowest point. Wherever the term "bubble" is used in the specification and claims, it is intended to cover all such well-known bubble equivalents.

Having thus described my invention what I claim is:

1. A unitary hand-manipulated portable level comprising a pair of spaced upstanding containers of relatively large cross sectional area and free from connection with a base or supporting surface, an elongated small bore capillary tube extending generally horizontally between the containers and connected with the sides of the containers a substantial distance below their tops, said capillary tube having an indicating scale marked thereon for coaction with a movable bubble disposed within the capillary tube and completely filling the cross sectional area thereof, the bubble serving to completely separate two masses of a liquid held by the capillary tube and containers on opposite sides of the bubble, the liquid serving to propel the bubble through the capillary tube when the level is tilted from the horizontal, the capillary tube having portions of enlarged cross sectional area near its ends and near its junctions with the containers, said portions forming traps to prevent the bubble from leaving the capillary tube and entering either container, a substantially horizontal by-pass tube connecting the lower ends of the containers below the capillary tube, and a stopcock connected in the by-pass tube.

2. A unitary hand-manipulated portable level comprising a pair of spaced upstanding containers of relatively large cross sectional area and free from connection with a base or supporting surface, an elongated small bore capillary tube extending generally horizontally between the containers and connected with the sides of the containers a substantial distance below their tops, said capillary tube having an indicating scale thereon for coaction with a movable bubble disposed within the capillary tube and completely filling the cross sectional area thereof, the bubble serving to completely separate two masses of a liquid held by the capillary tube and containers on opposite sides of the bubble, the liquid serving to propel the bubble through the capillary tube when the level is tilted from the horizontal, a substantially horizontal by-pass tube connecting the lower ends of the containers below the capillary tube, and a stopcock connected in the by-pass tube.

JEROME ROTHSTEIN.

References Cited in the file of this patent

UNITED STATES PATENTS

| Number | Name | Date |
|---|---|---|
| 609,231 | Hicks et al. | Aug. 16, 1898 |
| 652,078 | Cable | June 19, 1900 |
| 2,008,885 | Upson | July 23, 1935 |
| 2,142,124 | Gardner | Jan. 3, 1939 |
| 2,189,790 | Gardner et al. | Feb. 13, 1940 |
| 2,509,327 | Young | May 30, 1950 |
| 2,617,305 | Dahm | Nov. 11, 1952 |

FOREIGN PATENTS

| Number | Country | Date |
|---|---|---|
| 336,310 | France | Jan. 11, 1904 |
| 26,252 | Great Britain | of 1907 |
| 300,826 | Germany | Apr. 27, 1915 |
| 347,808 | England | May 7, 1931 |
| 514,040 | Germany | of 1930 |
| 801,221 | France | of 1936 |
| 471,983 | Great Britain | of 1937 |
| 661,862 | Germany | of 1938 |